United States Patent
Wood et al.

(10) Patent No.: US 11,810,137 B2
(45) Date of Patent: *Nov. 7, 2023

(54) SYSTEM AND METHOD FOR CREATING SEGMENTATION OF A POPULATION

(71) Applicant: Merkle, Inc., Columbia, MD (US)

(72) Inventors: Robert Lee Wood, Ellicott City, MD (US); Futoshi Yumoto, Fulton, MD (US); Thomas D. Lacki, Eden Prairie, MN (US)

(73) Assignee: Merkle, Inc., Columbia, MD (US)

( * ) Notice: Subject to any disclaimer, the term of this patent is extended or adjusted under 35 U.S.C. 154(b) by 208 days.

This patent is subject to a terminal disclaimer.

(21) Appl. No.: 16/878,913

(22) Filed: May 20, 2020

(65) Prior Publication Data

US 2020/0286110 A1 Sep. 10, 2020

Related U.S. Application Data

(63) Continuation of application No. 15/681,212, filed on Aug. 18, 2017, now Pat. No. 10,664,854, which is a
(Continued)

(51) Int. Cl.
*G06Q 30/0204* (2023.01)
*G06Q 30/0203* (2023.01)
*G06Q 10/067* (2023.01)

(52) U.S. Cl.
CPC ....... *G06Q 30/0204* (2013.01); *G06Q 10/067* (2013.01); *G06Q 30/0203* (2013.01)

(58) Field of Classification Search
CPC ............ G06Q 30/0204; G06Q 10/067; G06Q 30/0203; G06Q 30/0202
(Continued)

(56) References Cited

U.S. PATENT DOCUMENTS 7,424,439 B1 9/2008 Fayyad et al.
7,769,626 B2 8/2010 Reynolds
(Continued)

OTHER PUBLICATIONS

F.O. Isinkaye, Recommendation systems: Principles, methods and evaluation, 2015 (Year: 2015).*
(Continued)

*Primary Examiner* — Tarek Elchanti
(74) *Attorney, Agent, or Firm* — Finnegan, Henderson, Farabow, Garrett & Dunner LLP

(57) ABSTRACT

A system including a processor may filter a population to identify a group having members, and deliver, over an electronic network, a survey to members of the group to determine value preferences and value gaps. The survey may be made according to a set of paired comparisons or other related techniques. The system may generate vectors according to the determined value preferences and value gaps for members of the group, which may have lengths equal to numbers of determined values for the members. The system may cluster members of the group into segments by calculating patterns of differences between generated vectors. Results of this process enable the creation of a predictive model to estimate segment membership, which can be used in the generation of a promotion for display corresponding to a clustered segment, and deliver the promotion to a client device associated for display.

20 Claims, 7 Drawing Sheets

Related U.S. Application Data continuation of application No. 15/226,586, filed on Aug. 2, 2016, now Pat. No. 9,741,047, which is a continuation of application No. 15/212,067, filed on Jul. 15, 2016, now abandoned.

(58) Field of Classification Search
USPC .................. 705/14.66, 26.7, 14.53; 706/13
See application file for complete search history.

(56) References Cited

U.S. PATENT DOCUMENTS

| | | | |
|---|---|---|---|
| 8,301,482 B2 | 10/2012 | Reynolds et al. | |
| 2002/0029162 A1 | 3/2002 | Mascarenhas | |
| 2002/0107858 A1* | 8/2002 | Lundahl | G06F 18/23 |
| 2003/0088458 A1* | 5/2003 | Afeyan | G06N 7/01 |
| | | | 706/13 |
| 2005/0091077 A1 | 4/2005 | Reynolds | |
| 2009/0248523 A1 | 10/2009 | Hueter et al. | |
| 2012/0005053 A1 | 1/2012 | Burgess et al. | |
| 2013/0006766 A1* | 1/2013 | Dedeoglu | G06Q 30/0249 |
| | | | 705/14.53 |
| 2013/0046613 A1* | 2/2013 | Farahat | G06Q 30/00 |
| | | | 705/14.66 |
| 2014/0316934 A1* | 10/2014 | Villegas | G06Q 10/06393 |
| | | | 705/26.7 |

OTHER PUBLICATIONS

International Search Report & Written Opinion, PCT/US2017/41723, dated Aug. 4, 2017 (8 pgs.).
Gupta, S. and Chintagunta, P.K., 1994. On using demographic variables to determine segment membership in logit mixture models. Journal of Marketing Research, 31(1), pp. 128-136. (Year: 1994).
Kamakura, W.A. and Mazzon, J.A., 1991. Value segmentation: A model for the measurement of values and value systems. Journal of consumer research, 18(2), pp. 208-218. (Year: 1991).
McDonald, Malcolm, and Ian Dunbar. Market segmentation: How to do it, how to profit from it. Butterworth-Heinemann (2004).
Rigby, Darrell K., Frederick F. Reichheld, and Phil Schefter, "Avoid the Four Perils of CRM,." *Harvard Business Review*, 80:2, pp. 101-109 (2002).
Smith, Wendell R, "Product Differentiation and Market Segmentation as Alternative Marketing Strategies," *Marketing Management*, pp. 63-65 (1995).
Fennell, Geraldine, et al., "The effectiveness of demographic and psychographic variables for explaining category use." *Quantitative Marketing and Economics* , 1:2, pp. 223-244 (2003).
Vinson, Donald E., Jerome E. Scott, and Lawrence M. Lamont, "The Role of Personal Values in Marketing and Consumer Behavior," *The Journal of Marketing*, pp. 44-50 (1977).
Henry, Walter A. "Cultural Values do Correlate with Consumer Behavior," *Journal of Marketing Research*, pp. 121-127 (1976).
Gutman, Jonathan, "A Means-end Chain Model based on Consumer Categorization Processes." *The Journal of Marketing*, pp. 60-72 (1982).
Kim, Jai-Ok, et al., "Cross-cultural Consumer Values, Needs and Purchase Behavior," *Journal of Consumer Marketing*, 19:6, pp. 481-502 (2002).
Wang, Cheng-Lu, et al. "The influence of hedonic values on consumer behaviors: an empirical investigation in China." Journal of Global Marketing 14. 1-2: 169-186 (2000).
Wedel, Michel, and Wagner A. Kamakura, "Market Segmentation: Conceptual and Methodological Foundations," Kluwer Academic Publishers pp. 3-6 (2012).
Schwartz, Shalom H., Gian Vittorio Caprara, anad Michele Vecchione, "Basic Personal Values, Core Political Values, and Voting: A longitudinal Analysis," *Political Psychology*, 31:3, pp. 421-452 (2010).

Reynolds, Thomas J., Charles E. Gengler, and Daniel J. Howard, "A Means-end Analysis of Brand Persuasion through Advertising," *International Journal of Research in Marketing*, 12:3, pp. 257-266 (1995).
Davenport, Thomas H., and John C. Beck. The Attention Economy: Understanding the New Currency of Business, *Harvard Business Press* (2001).
Schwartz, Shalom H. Universals in the content and structure of values, "Theoretical Advances and Empirical Tests in 20 Countries," *Advances in Experimental Social Psychology*, 25:1, pp. 1-65 (1992).
Gengler, Charles E., and Thomas J. Reynolds. "Consumer Understanding and Advertising Strategy: Analysis and Strategic Translation of Laddering Data." *Journal of advertising Research*, 35.4, pp. 19-24 (1995).
Reynolds, Thomas J., and David B. Whitlark. "Applying Laddering Data to Communications Strategy and Advertising Practice," *Journal of Advertising Research*, 35:4, pp. 9-18 (1995).
Muller, Thomas E. "Using Personal Values to Define Segments in an International Tourism Market," International Marketing Review, 8:1 (1991).
Doran, Caroline Josephine. "The Role of Personal Values in Fair Trade Consumption," *Journal of Business Ethics*, 84:4: 549-563 (2009).
Madrigal, Robert. "Personal Values, Traveler Personality Type, and Leisure Travel Style," *Journal of Leisure Research*, 27:2, p. 125-142 (1995).
Kamakura, Wagner A., and Thomas P. Novak. "Value-system Segmentation: Exploring the Meaning of LOV," *Journal of Consumer Ressearch*, pp. 119-132 (1992).
Klenosky, David B., Charles E. Gengler, and Michael S. Mulvey. "Understanding the Factors Influencing Ski Destination Choice: A means-end Analytic Approach," Journal of Leisure Research, 25:4, pp. 362-379 (1993).
Mehmetoglu, Mehmet, et al. "The Relationship Between Personal Values and Tourism Behavior: A Segmentation Approach," *Journal of Vacation Marketing*, 16:1, pp. 17-27 (2010).
Homer, Pamela M., and Lynn R. Kahle. "A Structural Equation Test of the Value-Attitude-Behavior Hierarchy," Journal of Personality and social Psychology, 54.4 p. 638-646 (1988).
May, Rollo, "The Meaning of Anxiety", WW Norton & Company, p. 363-380 (1996).
Barlow, David H. "Unraveling the Mysteries of Anxiety and Its Disorders from the Perspective of Emotion Theory," American Psychologist, 55:11, p. 1247 (2000).
May, Rollo & Irvin Yalom, "Existential Psychotherapy," Current Psychotherapies, p. 1-38 (2013).
May, Rollo. "The Meaning of Anxiety (rev. ed.)," New York, p. 363-380 (1977).
Fotopoulos, Christos, Athansios Krystallis, and Pagiaslis Anastasios, "Portrait Value Questionnaire's (PVQ) Usefulness in Explaining Quality Food-Related Consumer Behavior," *British Food Journal*, pp. 248-279 (2011).
Wharton, Zowie, and Howard R. Harmatz, Harmatz, "Responses to the Economy Among Two Value Orientation segments," *Journal of Economic Psychology*, 16:2, pp. 205-222 (1995).
Chryssohoidis, George M., and Athanassios Krystallis, "Organic Consumers' Personal Values Research: Testing and Validating the List of Values (LOV) Scale and Implementing a Value-Based Segmentation Task," *Food Quality and Preference*, 16:7, pp. 585-599 (2005).
Tóth, Agnes Hofmeister, and Gedeon Totth, "Wine Purchase Behavior and Personal Value Based Consumer Segmentation" (2002).
Ekinci, Yuksel, and Joseph S. Chen. "Segmenting Overseas British Holidaymakers by Personal Values," *Journal of Hospitality & Leisure Marketing*, 9:3-4, pp. 5-15 (2001).
Li, C. et al. "Segmentation of Culturally Diverse Visitors' Values in Forest Recreation Management," pp. 19-29 (2007).
Krystallis, Athanasios, Marco Vassallo, and George Chryssohoidis, "The Usefulness of Schwartz's 'Values Theory' in Understanding Consumer Behavior Towards Differentiated Products," Journal of Marketing Management, 28:11-12, pp. 1438-1463 (2012).

(56) References Cited

OTHER PUBLICATIONS

Marchand, June, and Zakaria Khallaayoune, "'LOV' and the big screen: A Value-system Segmentation of Moviegoers," Journal of Targeting, Measuremenet and Analysis for Marketing, 18:3, pp. 177-188 (2010).

Higgins, E. Tory, Ruth Klein, and Timothy Strauman. "Self-concept Discrepancy Theory: A Psychological Model for Distinguishing Among Different Aspects of Depression and Anxiety." *Social cognition*, 3:1, p. 51 (1985).

Higgins, E. Tory, et al. "Self-discrepancies and Emotional Vulnerability: How Magnitude, Accessibility, and Type of Discrepancy Influence Affect," *Journal of Personality and Social Psychology*, 51:1, p. 5 (1986).

Higgins, E. Tory, "Self-discrepancy: A Theory Relating Self and Affect," *Psychological Review*, 94:3, p. 319 (1987).

Bruch, Monroe A., Kathy M. Rivet, and Helene J. Laurenti, "Type of Self-discrepancy and Relationships to Components of the Tripartite Model of Emotional Distress," *Personality and Individual Differences*, 29:1, pp. 37-44 (2000).

\* cited by examiner

600

Value Preference —601

*Which of the following values is most important to you?*

● (A) Having financial security (freedom from poverty or want)
○ (B) Being a wise steward (a prudent manager of property and finances)

Value Gap —603

*Please rate the extent to which you believe you actually have the following attribute:*

(B) Being a wise steward (a prudent manager of property and finances)
○ To a very small extent
○ To a small extent
● To a moderate extent
○ To a large extent
○ To a very large extent

Modeling Calibration —605

*Which of the following companies is most appealing to you?*

● Company A: Our whole life products...
○ Company B: Our whole life products...

FIG. 6

SYSTEM AND METHOD FOR CREATING SEGMENTATION OF A POPULATION

CROSS REFERENCE TO RELATED APPLICATIONS

This application is a continuation of U.S. patent Ser. No. 15/681,212, filed on Aug. 18, 2017 (now U.S. Pat. No. 10,664,854), which is a continuation of U.S. patent application Ser. No. 15/226,586, filed on Aug. 2, 2016 (now U.S. Pat. No. 9,741,047), which is a continuation of and claims the benefit of priority to U.S. application Ser. No. 15/212,067, filed Jul. 15, 2016. The disclosures of the above-referenced applications are expressly incorporated herein by reference in their entireties.

TECHNICAL FIELD

The present disclosure generally relates to computerized systems and methods for creating a segmentation of a general population of consumers. The present disclosure also relates to creating a segmentation according to motivation- or value-based differences.

BACKGROUND

A vendor may target specific consumers, in a population of consumers, to address individualized marketplace needs. For example, a vendor may provide promotions customized for certain potential customers. Such promotional content (e.g. advertisements) may be uniquely tailored to different consumers. Personalizing promotional content for electronic delivery can lead to an increase in revenues, but there are some shortcomings. For example, marketing to address singular customer needs may be overly burdensome, time consuming, infeasible due to scalability, and expensive.

Consumer needs and wants may overlap with other needs and wants. Marketing based on dividing a prospective consumer audience into discrete categories representative of a particular defining characteristic can be beneficial. For example, clustering based on select behavioral data, demographic data, and product preferences may improve efficiency and reduce cost. Segmentation according to these conventional categories, however, may deprive a marketer of the benefits of marketing by category. For example, two consumers of the same age may receive the same advertisement because they are categorized in the same manner based on age. However, these consumers may be at different stages of their lives and thus have different motivations or values. This can lead to one consumer in the category enthusiastically purchasing the advertised product while the other consumer is vehemently opposed to purchasing the product. Segmenting these two consumers solely on a single basis (e.g., age) can be inefficient and ineffective. Therefore, there is a need for an improved method of segmentation that addresses the values, attitudes, and interests that inform the decision-making processes of individual consumers.

SUMMARY

One aspect of the present disclosure is directed to a system including a processor. The system may filter a population to identify a group having members, and deliver, over an electronic network, a survey to members of the group to determine value preferences and value gaps (e.g., gaps between a current state and a desired state relative to a particular value) for the members of the group. The survey may be made according to a set of paired comparisons. The system may generate vectors according to the determined value preferences and value gaps for members of the group. The vectors may have lengths equal to numbers of determined values for the members. The system may cluster members of the group into multiple segments by calculating differences between the vectors. The system may also create a predictive model to estimate segment membership derived from the survey of a subset of consumers from the full potential consumer population by aid of a marketing database. The system may also generate a promotion for display corresponding to a clustered segment, and deliver the promotion to a client device associated for display.

Another aspect of the present disclosure is directed to a method for creating segmentation of a population. The method may be performed by a processor configured to execute the instructions. The method may include filtering a population to identify a group having members, and delivering, over an electronic network, a survey to members of the group to determine value preferences and value gaps for the members of the group. The survey may be made according to a set of paired comparisons. The method may include generating vectors according to the determined value preferences and value gaps for members of the group, and the vectors may have lengths equal to numbers of determined values for the members. The method may include clustering members of the group into multiple segments by calculating differences between the vectors. The method may also include creating a predictive model to estimate segment membership derived from the survey of a subset of consumers from the full potential consumer population by aid of a marketing database. The method may also include generating a promotion for display corresponding to a clustered segment, and delivering the promotion to a client device associated for display.

Yet another aspect of the present disclosure is directed to a non-transitory computer-readable medium. The non-transitory computer-readable medium may store instructions executable by a processor to perform for a method for creating a segmentation of a population. The method may include filtering a population to identify a group having members, and delivering, over an electronic network, a survey to members of the group to determine value preferences and value gaps for the members of the group. The survey may be made according to a set of paired comparisons. The method may include generating vectors according to the determined value preferences and value gaps for members of the group, and the vectors may have lengths equal to a number of determined values for the members. The method may include clustering members of the group into multiple segments by calculating differences between the vectors. The method may also include creating a predictive model to estimate segment membership derived from the survey of a subset of consumers from the full potential consumer population by aid of a marketing database. The method may also include generating a promotion for display corresponding to a clustered segment, and delivering the promotion to a client device associated for display.

Other systems, methods, and computer-readable media are also discussed herein.

BRIEF DESCRIPTION OF THE DRAWINGS

FIG. 6 is a diagrammatic illustration of exemplary survey questions, consistent with the disclosed embodiments.

DETAILED DESCRIPTION

Figure 1:
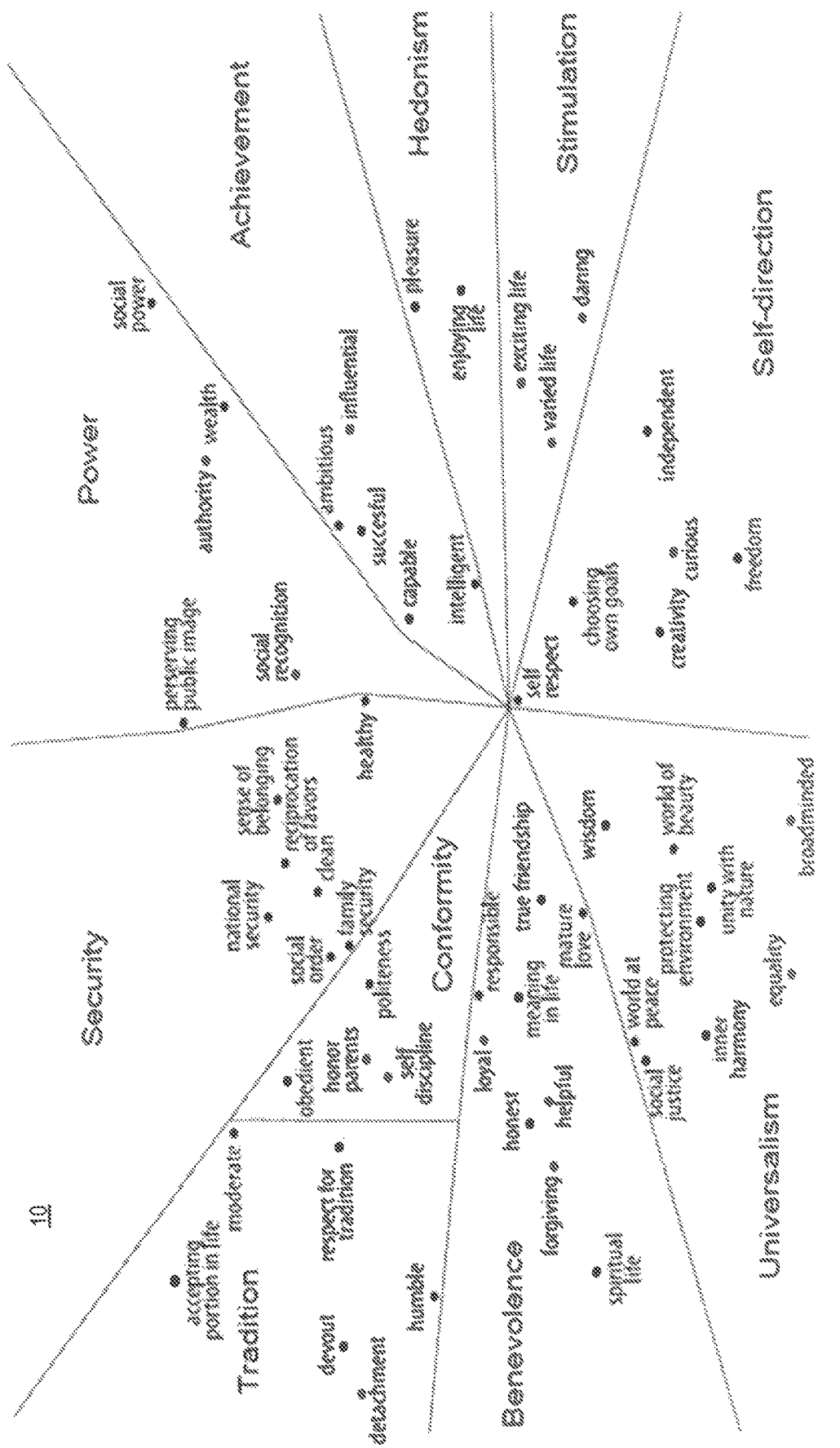
FIG. 1 is a diagrammatic illustration of prior art identifying an exemplary organization of human values by the correlational structure of their individual importance scores.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples, Instead, the proper scope of the invention is defined by the appended claims.

FIG. 1 is a diagrammatic illustration of prior art identifying an exemplary correlational organization of values by their rated importance scores, from "Universals in the content and structure of values: Theoretical advances and empirical tests in 20 countries," by Shalom H. Schwartz (Advances in experimental social psychology 25.1 (1992), pp. 1-65). These values have been studied globally with the nature of the values, and their relative positioning has remained fairly stable across cultures, with value preferences varying more than the value structure. As is shown in FIG. 1, the organization of human values includes a structure 10 segmented according to the categories of security, power, achievement, hedonism, stimulation, self-direction, universalism, benevolence, conformity, and tradition.

Included within each category are corresponding values and fundamental motivational interests. For example, the category of security includes values and fundamental motivational interests including national security, social order, family security, clean, sense of belonging, reciprocation of flavors, and healthy. Each value and fundamental motivational interest operates to further describe human behavior, and informs human choice in a variety of contexts including but not limited to economic decision-making. For example, prudent economic decisions are necessary to maintain family security. While the availability of resources and market constraints may dictate the buying and selling within a market, rational and irrational exuberance according to these behavioral economic values may drive purchasing decisions.

Accordingly, marketing to these categorical values and fundamental motivational interests may lead to improved sales. Specifically, clustering or segmenting a population according to these prior art values or others, as further contemplated consistent with the following disclosed embodiments, may enhance vending.

Figure 2:
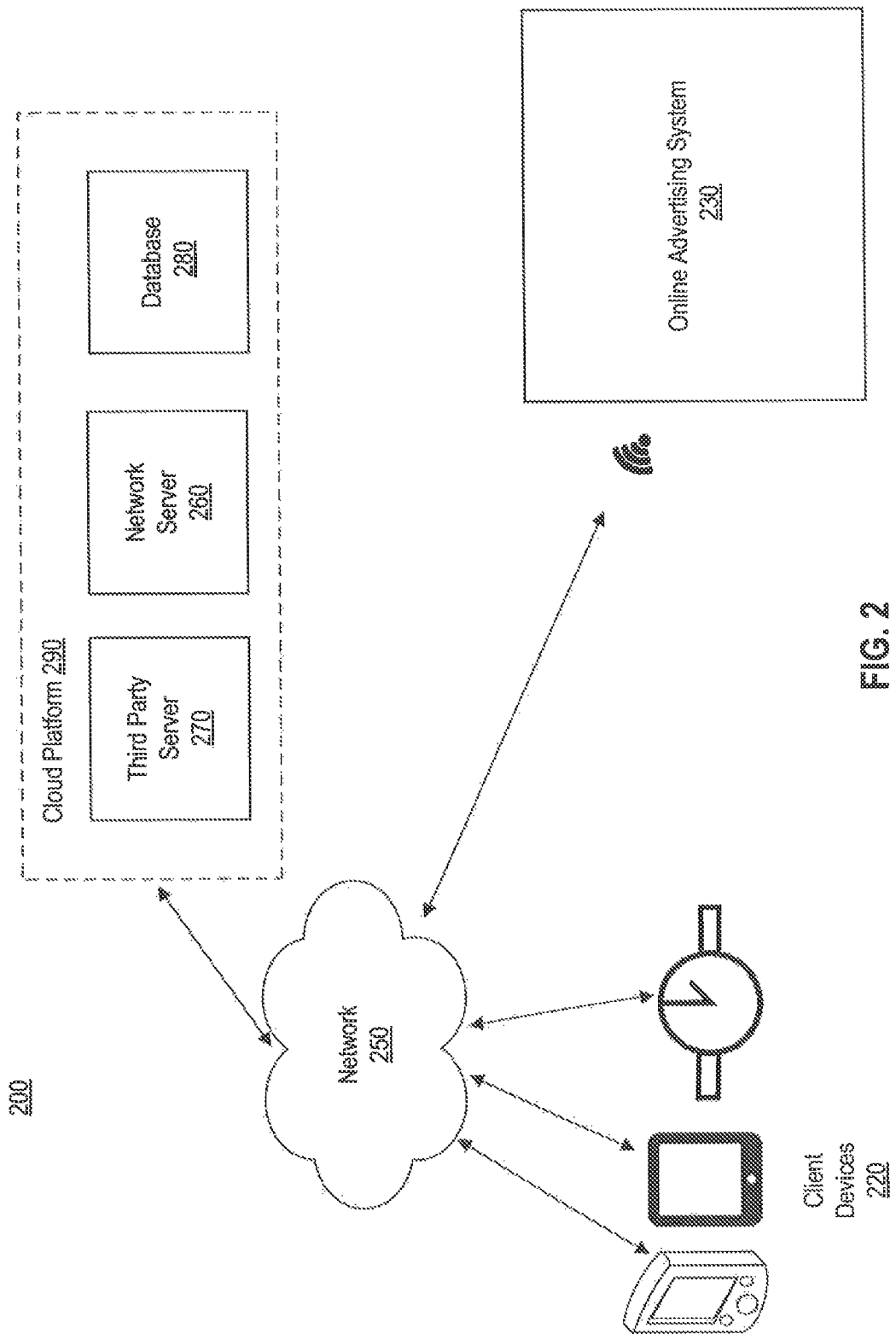
FIG. 2 is a schematic block diagram illustrating an exemplary embodiment for creating a segmentation of a population.

However, problems exist with traditional methods of computerized marketing to consumers using these categories. For example, while being "helpful" is important to two different consumers, being "independent" may be much more important to the first of those two consumers. Thus, marketing a product that emphasizes togetherness and helpfulness may not be appealing to the first consumer, FIG. 2 is a schematic block diagram illustrating an exemplary embodiment for segmenting a population, consistent with the disclosed embodiments. As illustrated in FIG. 2, a system 200 may include one or more client devices 220, an online advertising system 230, and a network 250.

System 200 may include client devices 220, such as smartphones, tablets, computers, or other computing devices, to access network 250. Client devices 220 may include client computing devices such as, for example, desktop computers, notebook computers, mobile devices, tablets, smartphones, wearable devices such as smart watches, smart bracelets, smart glasses, or any other client devices that communicate with network 250. Client devices 220 may also include software and executable programs including but not limited to promotional and advertising applications. Internet, HTML, cookie-based, adware, and other applications are contemplated. Client devices 220 may be operated by one or more consumers (also known as users or clients) to which promotions are targeted.

An online advertising system 230 of system 200 may include system storage, system applications, caches, and relevance and ranking modules. (Online advertising system 230 is an example of a type of computerized system which benefits from the technical aspects of the inventive concepts.) Online advertising system 230 may also include graphical and banner advertising applications, consumer clicking applications, pricing applications, and publishing applications. Online advertising system 230 may be configured to be operated by a network administrator controlling online advertising system 230, remotely controlled, and/or autonomously controlled via network server 250. Online advertising system 230 may include the components as further described and shown (with reference to FIG. 4).

System 200 may allow for one or more client devices 220 to transfer information associated with answers to the one or more survey questions (with reference to FIG. 6) over network 250 to a cloud platform 290 and/or online advertising system 230. Value preference and value "gap" information may also be transferred. A value gap may include a distance or displacement between an optimal value status and a current value state, System 200 may include mobile or stationary (not shown) client devices 220 located in residential premises and non-residential premises configured to communicate with network 250. Client devices 220 may connect to network 250 by Wi-Fi or wireless access points (WAP). Bluetooth® or similar wireless technology may be contemplated. Those skilled in the art will appreciate that network 250 may include a cellular network, a satellite network, the Internet, or a combination of these (or other) networks that are used to transport data. Furthermore, client devices 220 may connect to network 250 according to a wired network, such as an Ethernet network (not shown). Network 250 may provide, for example, authentication services that enable client devices 220 to access information, including stored survey questions, responses, and consumer data. This data and metadata may include, for example, demographic data, channel preference data, psychographic data including attitudinal and behavioral information, media usage data, and product experience (further described below with reference to FIG. 4) corresponding to associated value data, consumer data, and advertisement data.

In exemplary system 200, client devices 220 and online advertising system 230 may communicate with one or more servers in cloud platform 290 through network 250, Cloud platform 290 may comprise one or more network servers 260, third party servers 270, and/or databases 280. Servers 260 and 270 may provide cloud services for users and their client devices 220. For example, a cloud-based microservice may be implemented comprising a distributed portion that executes at another location in network 250 and a corresponding cloud portion that executes on a network server 260 in cloud platform 290. Servers in cloud platform 290 may also communicate with online advertising system 230 over network 250 using appropriate cloud-based communication protocols, such as SOAP or REST and/or other protocols that would be known to those skilled in the art. Such communication may allow for control of online advertising system 230 consistent with, for example, network server 260.

As shown in FIG. 2, network 250 may be accessible to network servers 260, third party servers 270, and databases 280 in cloud platform 290, for sending and receiving of information, such as value preference or gap information, consumer information, and advertising instructions, within system 200. Network server 260, third party server 270, and database 280 may include networking, cloud, and/or backup services. For example, in some embodiments, network server 260 may include a cloud computing service such as Microsoft Azure™ or Amazon Web Services™. Additional cloud-based wireless access solutions compatible with the LTE standard (e.g., using the 3.5 GHz spectrum in the US) are contemplated. In some embodiments, third party server 270 may include a messaging or notification service, for example, that may notify a group member of updates or changes to a member's survey responses, and corresponding updates to a member's value preferences and gaps (further described with reference to FIG. 6).

Figure 3:
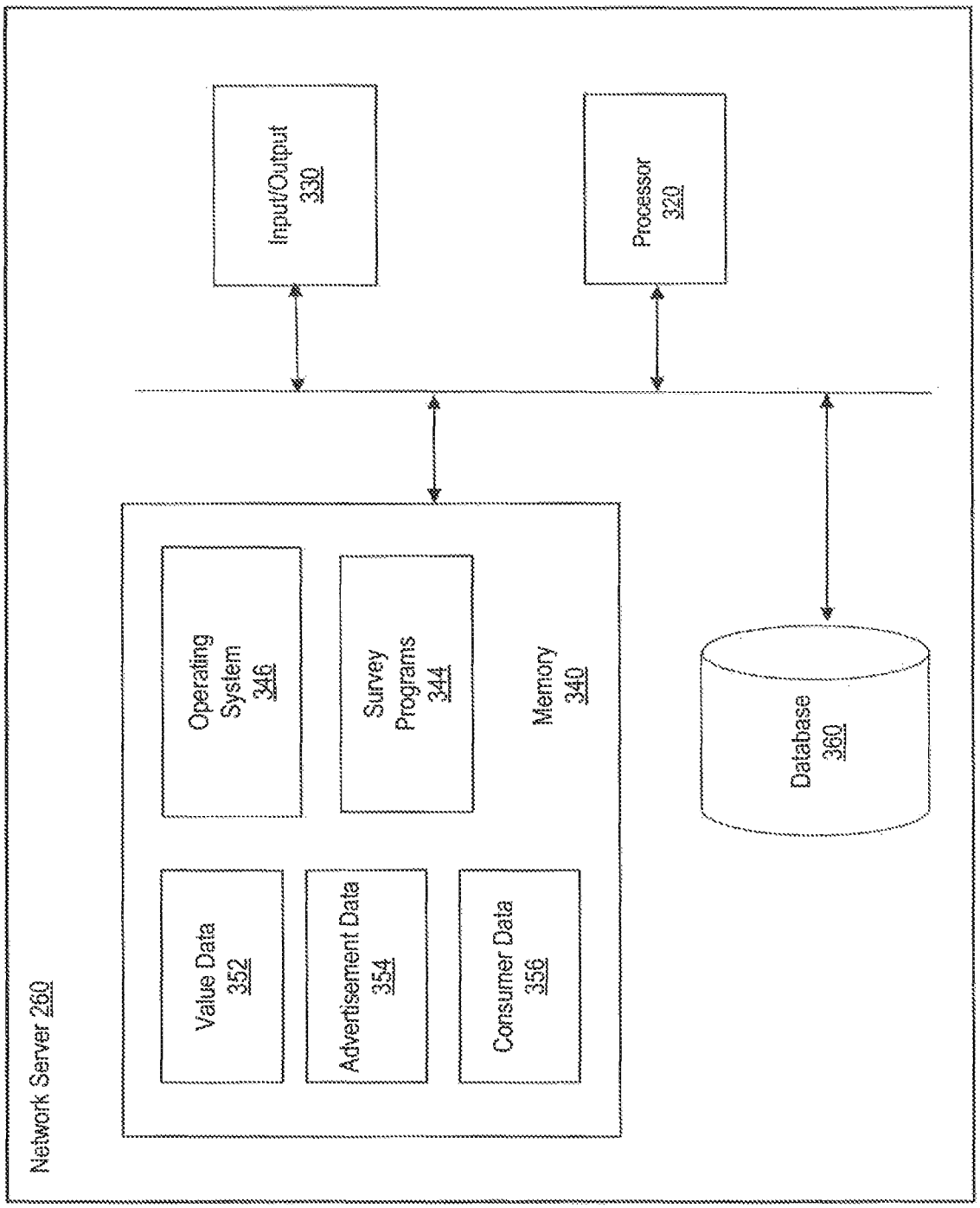
FIG. 3 is a schematic block diagram illustrating an exemplary embodiment of a network server, consistent with the disclosed embodiments.

FIG. 3 is a schematic block diagram illustrating an exemplary embodiment of network server 260, consistent with the disclosed embodiments. As shown in FIG. 3, network server 260 may include, among other things, a processor 320, input/output (I/O) devices 330, memory 340 for storing and/or accessing value, advertising, and consumer affiliated data and programs, and a database 360, each coupled to one or more interconnected internal buses (not shown). The programs stored in memory may include, for example, server programs 344 and an operating system 346. Server programs 344 may implement predictive learning advertising algorithms consistent with disclosed embodiments using a cloud-based microservice or, alternatively, a separate software program for execution in network server 260. In alternative embodiments, software program 344 may be located in client devices 220 or in online advertising system 230 (as referenced in FIG. 4), to implement the predictive learning advertising systems and methods according to captured value information, advertisement data, and consumer data.

Memory 340 and/or database 360 may store consumer data 356 based on individual and/or aggregate consumer behavior, such as data indicating consumers sending or modifying responses to survey questions to online advertising system 230. The memory also may store other data and programs (not shown). Consumer data 356 may include consumer login and/or other identification (ID) or consumer credentials, group membership, authentication timestamp information, network node or access point location(s) and/or preferences, and other metadata generated by algorithms in the server programs 344. Memory 340 and/or database 360 also may store advertisement data 354 and value information 352, and may further store other software programs and data that are not shown. Advertisement data 354 may include a list of promotional graphics or banners advertised according to received consumer data 356 and value information 352. Other advertisement data may be contemplated. Value information 352 may include saved and stored value preference and value gap information (further described below with reference to FIG. 6). Group membership clustering or clustering outcomes may be determined based on value information 352 and associated consumer data 356, and promotional advertising may be generated and delivered to a client device 220 based on the group segmentation and associated advertisement data 354, as determined by one or more processors 320.

Database 360 may include Microsoft SQL databases, SharePoint databases, Oracle™ databases, Sybase™ databases, or other relational databases. Database 360 may also be implemented as one or more other types of data stores, such as arrays, linked lists, text files, tables, or the like. Memory 340 and database 360 may be implemented using any volatile or non-volatile memory including, for example, magnetic, semiconductor, tape, optical, removable, non-removable, or any other types of storage devices or computer-readable mediums.

Figure 4:
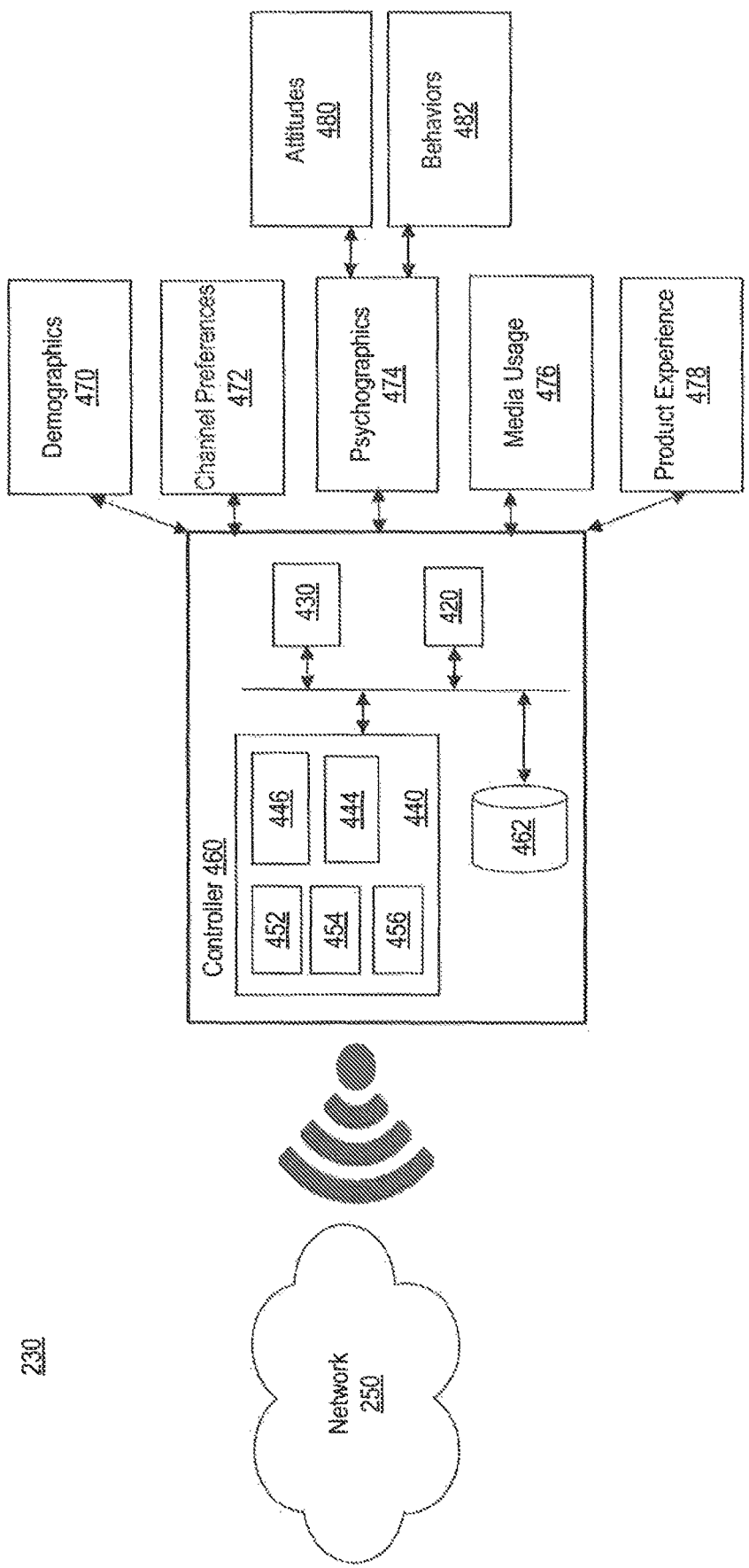
FIG. 4 is a schematic block diagram illustrating an exemplary embodiment of an online advertising system, consistent with the disclosed embodiments.

I/O interfaces 330 may include not only network interlace devices, but also user interface devices, such as one or more keyboards, mouse devices, and graphical user interfaces (GUIs) capable of use with client devices 220. Network server 260 may receive consumer data 356, advertisement data 354, and value information 352 from network 250 through I/O device 330, and analyze such data. Network server 260 may determine clustering outcomes based on the value information, identify advertising based on the clustering outcomes, and send instructions to online advertising system 230 across network 250 to deliver advertising over the Internet to a client device 220. Network server 260 may store a copy of the customer data 356, advertising data 354, and value data 352, clustering outcomes or group membership, and promotional segmentation it transmits to online advertising system 230 for advertising, for example, in memory 340, database 360, database 380, or in any other database accessible to the server 260, FIG. 4 is a schematic block diagram illustrating an exemplary embodiment of online advertising system 230, consistent with the disclosed embodiments. As illustrated in FIG. 4, online advertising system 230 may include a controller 460 capable of communicating with network 250. Controller 460 may function in a manner similar to network server 260 and may operate independently or co-dependently with network server 260. Online advertising system 230 may be capable of receiving value preferences or gaps (further described below with reference to FIG. 6) from one or more client devices 220 and/or cloud platform 290 over network 250. Controller 460 may receive consumer data 456, advertisement data 454, and value information 452, and associated clustering outcomes and corresponding promotional segmentation, and may store them in memory 440 or database 462. Controller 460 may include one or more processors 420, input/output devices 430, controller programs 444, and operating system 446. Controller 460 may be configured to receive information relating to consumer demographics 470 (e.g., information about consumers), communication channel preferences 472 (e.g., information about the types of communications that consumers prefer, such as email, text messaging, or phone calls), psychographics 474 (e.g., information about consumers' attitudes, aspirations, and other criteria), media usage 476 (e.g., information about the types of media that consumers use, such as movies, music, books, or websites), and product experience 478 (e.g., information about consumers' experience with particular products that are related to potential marketing opportunities). Psychographics 474 may include consumer attitudes 480 and behaviors 482. Demographics 470 may include at least one of age, gender, socio-economic status, or demographics associated with each consumer member of a segmented group.

According to received demographics 470, channel preferences 472, psychographics 474, media usage 476, product experience 478, attitudes 480, and behaviors 482, controller 460 may calculate value information 452 and cluster outcomes according to a vector analysis, and subsequently determine advertising for an online consumer. The vector analysis may include, for example, an LCA analysis (Latent Class Analysis) or a Mixture Analysis, by analyzing vectors representing the relative strengths of value preferences and value gaps. Selection of particular types of advertisements and advertisement content (not shown) may also be performed by controller 460. Furthermore, controller 460 may receive modifications for one or more value preferences or gaps in real-time, and may alter online advertising consistent with the changes in value preferences and gaps. Other operations may also be performed by controller 460. For example, controller 460 may identify segment membership related to users that are sent one or more surveys, and extrapolate from the information received in the surveys to estimate segment membership for an entire population (e.g., using information from a database containing information on consumers in that population).

Figure 5:
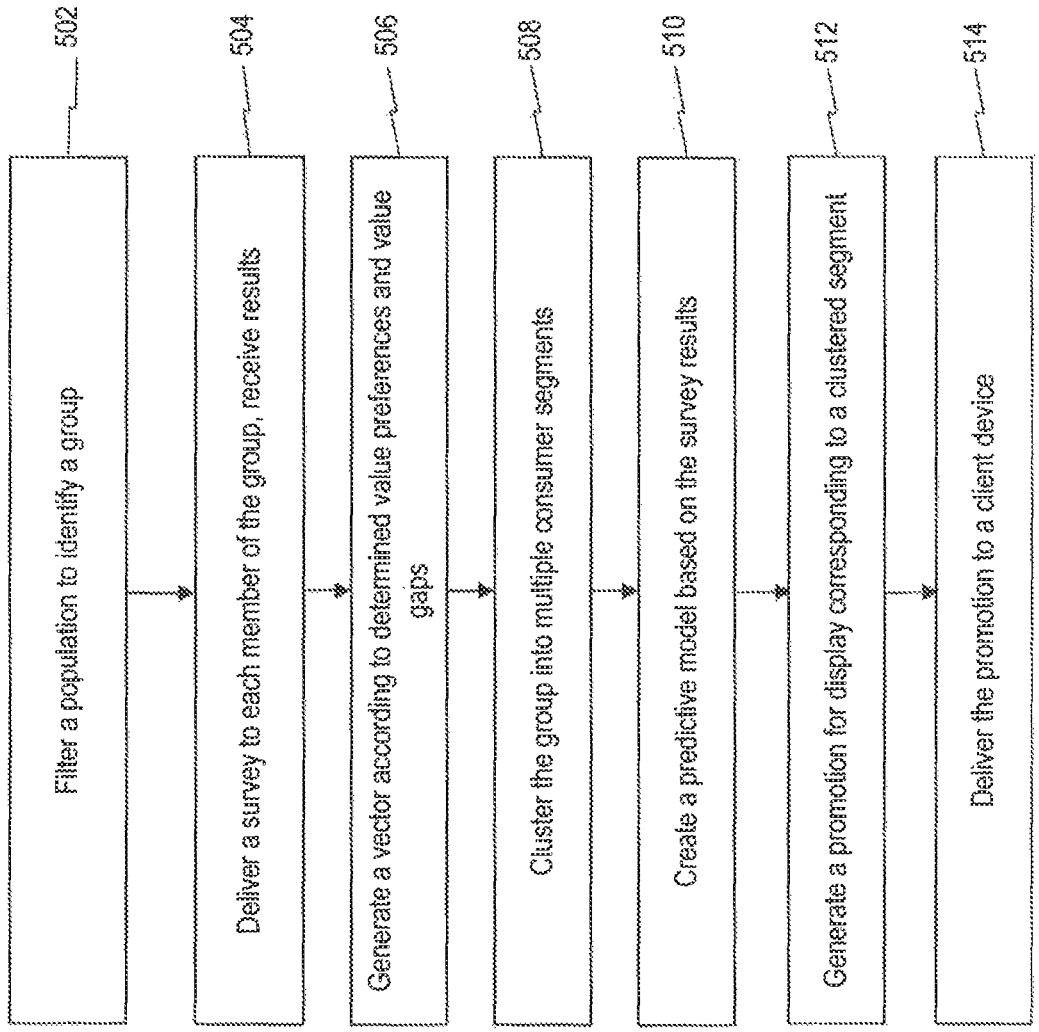
FIG. 5 is a flow chart illustrating an exemplary process for filtering and clustering a population, consistent with the disclosed embodiments.

FIG. 5 is a flow chart illustrating an exemplary process for filtering and clustering a population, consistent with the disclosed embodiments. While the exemplary method 500 is described herein as a series of steps, it is to be understood that the order of the steps may vary in other implementations. In particular, steps may be performed in any order, or in parallel. The one or more processors may include processors in network server 260 and/or processors in controller 460. In other words, each step of process 500 may be performed by one or more of network server 260, controller 460, or another device.

At step 502, process 500 may include filtering a population to identify a group. Population information may periodically be stored, accessed, modified, maintained, and received by client device 220 and/or network server 260. Population information may be received and filtered all at once, periodically, or as determined by network server 260 or controller 460 over time. Population information may be filtered prior to being received by network 250. Filtering the population may include filtering consumer members based on at least one of age, gender, socio-economic status, or demographics associated with each member. Other filtering criteria are contemplated to identify a group and consumer membership according to a particular group.

At step 504, process 500 may include delivering an electronic survey to consumer members of the group. The survey may, for example, be delivered to each member over an electronic network via email, text message (e.g., SMS or MMS), mobile notification, pop-up advertisement, pop-under advertisement, interstitial advertisement, or the like. The survey may correspond to a particular category, value, or fundamental motivational interest. The survey may be transmitted or sent as the result of instructions provided by network server 260 according to consumer data 356. For example, the instructions may indicate a survey should be transferred or exported from network server 260 and received or imported by client device 220 for use by a prospective consumer member. In some alternative embodiments, cloud platform 290 may transmit a survey automatically or periodically to client device 220, without any request. A plurality of surveys may be received by client device 220 from cloud platform 290 or may be delivered in sequence according to a predefined schedule. Several surveys may be delivered at the same time and stored in database 280 as instructed by a third party server 270 or network server 260. Other delivery methods may be used as well. Network server 260 may receive results (e.g., answers) of the survey over the same network the survey was sent using or over a different network.

The survey may be configured to determine value preferences and value gaps for each member of the group, and the survey may be analyzed according to a set of paired comparisons. This analysis may include a calculation or determination of a frequency of possible pairs of value preferences and gaps (as discussed below h reference to FIG. 6).

At step 506, process 500 may include generating a vector according to determined value preferences and value gaps. A packet of survey data including a set of paired survey comparisons may be received, and the relative strengths of value preferences and value comparisons based on the set of paired survey comparisons may be analyzed. Executable code may analyze the relative strength of value preferences and value gaps using a latent variable model to determine an interval nature and ranking of the value preferences and value gaps. Processors 320 may utilize a Bradley-Terry-Luce (BTL) model to analyze the relative strength of value preferences and value gaps. For example, processors 320 may implement the BTL model with an arbitrary center set at zero, in order to determine which of the preferences and gaps are more important or more valuable to the particular consumer. Other models may be used as well.

The determination of the value preferences and value gaps may be determined for some or all members of the surveyed group, and the vector may have a length equal to a number of measured values for each member. Each member may be represented by a binary vector with the length equal to the number of values being investigated. Other vector lengths not corresponding to a number of measured values are contemplated as well.

The generated vector may include a predetermined threshold to determine if a value preference and value gap are both positive, both negative, or if one is positive and one is negative. If the threshold indicates a positive preference and a positive gap, the value is considered important (or "preferred") and an important high gap exists. If the threshold indicates a negative preference and negative gap, the value is not considered important (or "preferred") and a low gap—or no gap—exists. The threshold may indicate any combination of importance or preference and high or low (no) gap according to positive or negative determinations.

The vector may, in some embodiments, include a value preference and a value gap. For example, the vector may be created with one slot for each of top level values, and accordingly, may be created with one slot for each of top level value preferences and value gaps. According to a predetermined threshold, a "1" may be placed in a slot if both the value preference and value gap for that value is positive, and a "0" otherwise. Algorithmic and programmatic methods according to server programs 344 for generating a binary vector are contemplated. Other methods for analyzing and generating the vector are contemplated.

At step 508, process 500 may include clustering the group of consumers into consumer segments. If it is determined that both a vector value preference and value gap are positive, the vector may be clustered into a segment with other generated vectors having both a value preference and value gap that are positive in similar patterns. Similarly, if the generated vector may have a value preference and value gap that are negative, the vector may be clustered into a segment with other generated vectors having both a value preference and value gap that are negative in similar patterns. The clustering of the group of consumers may also be accomplished by latent class analysis or mixture analysis. Other clustering methods may be contemplated. The clustering may include clustering at least two members of the group into multiple segments by calculating at least one difference between each generated vector and at least one other generated vectors associated with other members of the group. The clustering may include clustering the group of consumers into multiple consumer segments according to at least one of demographics, channel preferences, insurance experience, media usage, attitudes, behaviors, value preferences, value gaps, and psychographics (e.g., based on information discussed above with respect to FIG. 4). Various algorithmic and programmatic methods according to server programs 344 for determining cluster outcomes or segments based on identifying value information may be used.

At step 510, process 500 may include creating a predictive model. The predictive model may estimate segment membership derived from at least one received survey. In some embodiments, the predictive model may be created in order to estimate segment membership of a second set of members of the group using the received results. This second set of members of the group may include, for example, one or more members that did not receive a survey.

At step 512, process 500 may include generating a promotion for display corresponding to a clustered segment. Step 512 may include using the predictive model to determine which promotion to display to a particular member of the group. and at step 514, process 500 may include delivering the promotion to a client device 220. Network server 260 may generate a promotion for display to one or more client devices 220. Promotions may be identified, generated, and/or selected by the controller 460 or network server 260 based on value information 352. The one or more server programs 344 may interact with processor 320 and one or more controllers 460 to provide promotional content. The promotional content may include banner ads, animations, overlay video, audio, graphical displays, text, alerts, interactive user interfaces, or any type of advertisement as contemplated. The promotional content may also include any content corresponding to advertisement data 354 generated from the value-based clustered segmentation. The value-based clustered segmentation may be generated as a result of consumer data 356 including survey questions and survey responses and value data 352 including value preferences and value gaps vectors. Other promotional content may be contemplated.

Promotional content may be transmitted or sent as the result of instructions provided by network server 260 according to consumer data 356 or advertisement data 354. For example, the instructions may indicate that a promotion should be transferred or exported from network server 260 and received or imported by client device 220 for viewing by a prospective consumer member. In some alternative embodiments, cloud platform 190 may transmit a promotion automatically or periodically to client device 220, without any request. A plurality of promotions may be received by client device 220 from cloud platform 290 or may be delivered in sequence according to a predefined schedule. Several promotions corresponding to different value criteria may be delivered at the same time and stored in database 280 as instructed by a third party server 270 or network server 260. Other delivery methods may be contemplated.

FIG. 6 is a diagrammatic illustration of exemplary survey questions, consistent with the disclosed embodiments. As illustrated in FIG. 6, survey questions 600 may include questions directed to determining a value preference 601, questions directed to determining a value gap 603, and questions directed to determining a modeling calibration 605. Consistent with disclosed embodiments, survey questions may include any number of questions querying paired comparisons or any other numbers of options presented for a group member's selection. The survey questions may query any particular value including but not limited to a consumer's financial security and fiscal prudence, or any other value that may be contemplated as evaluated by use of an online advertising system 230. For example, as illustrated in FIG. 6, a survey question (601) may include determining a consumer's value preference between having financial security or being a wise steward. Upon a member selection of being a wise steward, another survey question (603) may include determining a consumer's value gap evaluating the extent to which a consumer is a wise steward. Other survey questions and responses are contemplated. Determination of a member's value preference and value gap may be stored in vector form and used for clustering segmentation, as described generally above.

In some embodiments, contingent upon the responses to the questions relating to prior value preference (601) and value gap (603), a subsequent modeling calibration (605) may query a paired comparison of two company products. Selection of a particular modeling calibration response may indicate to system 200 a particular advertisement to deliver corresponding to a member's clustered segmentation. The answers to the value preference questions 601, value gap questions 603, and modeling calibration questions 605 may be stored on hard drives of one or more client devices 220, and may also be stored as value information 352 in memory 340 or database 360 on cloud platform 290. Value information may also be stored in memory 340 or database 462 of controller 460. Survey response answers to questions 601, 603, 605 may be altered by a client device 220 in communication with online advertising system 230 or network server 260 to modify or change responses and/or to update response or value information.

Figure 7:
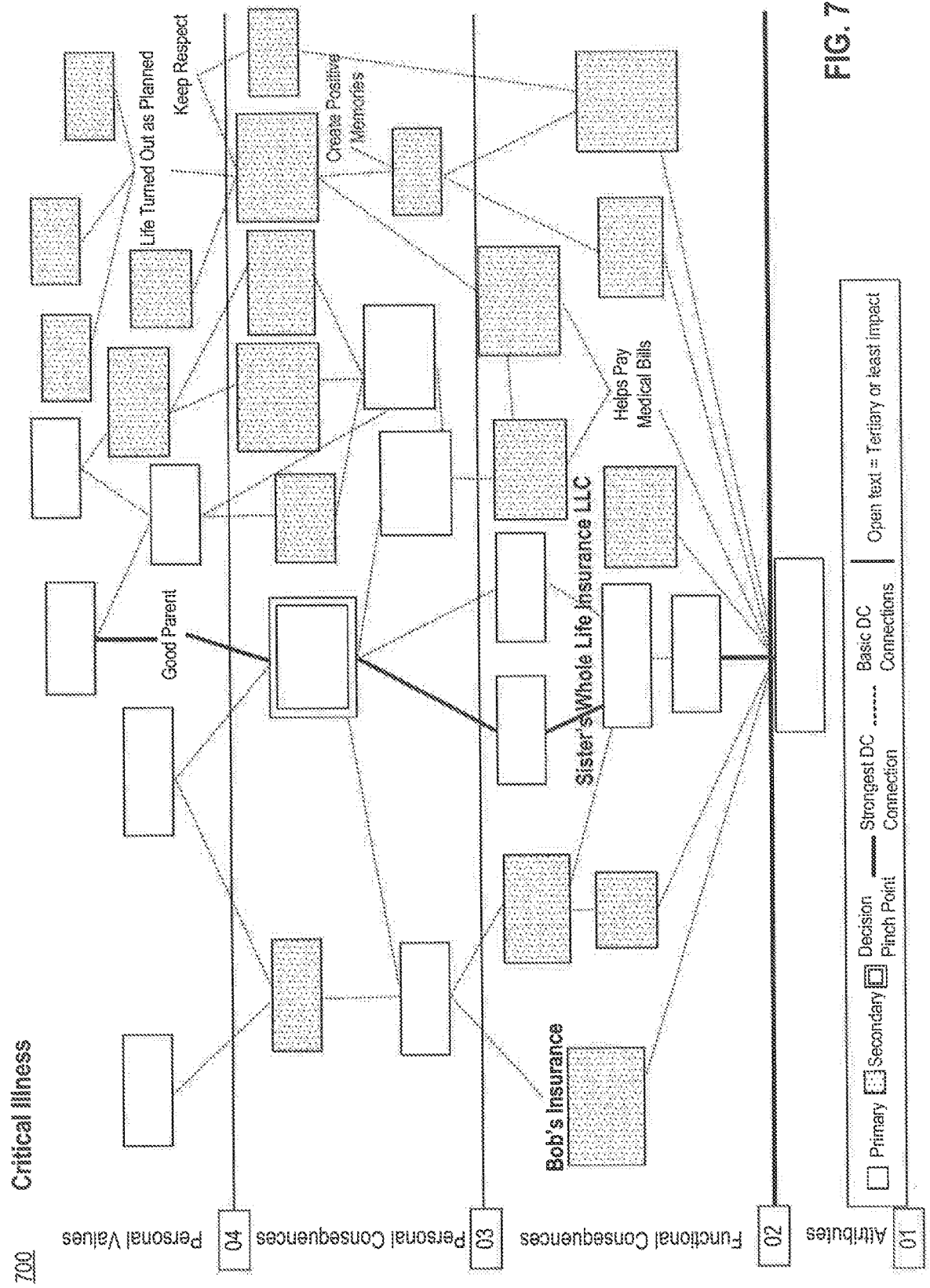
FIG. 7 is a diagrammatic illustration of a consumer decision map used by the systems and methods described throughout for generating and delivering promotions to consumer devices, consistent with the disclosed embodiments.

FIG. 7 is a diagrammatic illustration of a consumer decision map used by the systems and methods described herein for generating and delivering promotions to consumer devices, consistent with the disclosed embodiments. In accordance with a selected answer to modeling calibration 605 (in FIG. 6), FIG. 7 illustrates a resulting link between values and specific company products (and corresponding promotions) that may be marketed to a consumer. As illustrated in FIG. 7, personal values and personal consequences in collaboration with attributes and functional consequences indicate decision making choices for a consumer, for example, battling a critical illness.

As shown in FIG. 7, the consumer decision map indicates that a consumer may be more likely to purchase a policy from Bob's Insurance or a policy from Sister's Whole Life Insurance LLC according to the particular primary and secondary decision points surrounding personal value preferences as selected in survey questions (e.g., as shown in FIG. 6). For example, a consumer facing a critical illness may have a value preference of family love and security, and accordingly, have a value preference for being a good parent. As a value gap, a consumer facing a critical illness may desire to be a better provider for his or her family. Accordingly, as a functional consequence, the consumer may value spending more quality time with his or her family. The consumer decision map in FIG. 7 indicates that such a consumer may be likely to purchase a policy from Sister's Whole Life Insurance LLC. Based on this, a promotion can be tailored according to that purchase and electronically delivered to a client device.

FIG. 7 illustrates multiple value preferences and gaps that may need to be considered by a consumer, suffering from a critical illness, who is considering purchasing insurance. Accordingly, by presenting tailored survey questions (as discussed above with reference to FIG. 6) reflective of all the many value preferences and gaps, a tailored product can be identified for the consumer (as referenced in FIG. 7). Accordingly, a clustered consumer segmentation can be created to deliver promotional material to consumers according to specific psychographic values on one or more of their client devices 220.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system comprising:
one or more processors coupled to a network; and
one or more storage devices storing instructions that, when executed, configure the one or more processors to perform operations comprising:
implementing a cloud-based service comprising a distributed portion that executes at one or more client devices and a cloud portion executed by the one or more processors, the distributed portion configuring the one or more client devices to prefilter population data by processing the population data to generate packets comprising sets of paired comparisons associated with rankings before uploading the prefiltered population data to the network, the one or more client devices comprising display devices;
receiving, from the network, the prefiltered population data previously prefiltered by the one or more client devices, the prefiltered population data comprising the packets associated with a plurality of users;
determining value preferences and value gaps for the plurality of users based on the prefiltered population data and the packets;
generating a plurality of vectors corresponding to the plurality of users, the plurality of vectors having lengths equivalent to numbers associated with the value preferences and the value gaps;
clustering the plurality of users based on the plurality of vectors;
generating a predictive model that generates a group of members, the group of members comprising one or more of the plurality of users; and
generating, based on the predictive model and the clustered users, a promotion for display on the display devices of the one or more client devices in the group of members.

2. The system of claim 1, wherein
clustering the plurality of users comprises applying a value-based clustered segmentation; and
the promotion for display comprises content corresponding to advertisement data generated from the value-based clustered segmentation.

3. The system of claim 1, wherein:
generating the plurality of vectors comprises employing a Bradley-Terry-Luce model to analyze a relative strength of the value preferences and the value gaps;
the plurality of vectors comprise binary vectors each including a value preference and a value gap; and
each of the plurality of vectors comprises a predetermined threshold to determine if a value preference and value gap are both positive, both negative, or if one is positive and one is negative.

4. The system of claim 1, wherein the operations further comprise:
periodically filtering a population to identify the plurality of users; and
delivering one or more online surveys to the plurality of users according to a predefined schedule.

5. The system of claim 4, wherein delivering the one or more online surveys comprises receiving instructions from a third-party server to deliver the one or more online surveys concurrently.

6. The system of claim 1, wherein clustering the plurality of users comprises:
   determining value signs for each of the value preferences and each of the value gaps, the value signs being either positive or negative;
   clustering the plurality of vectors based a relationship between value signs of the value preferences and the value gaps,
   wherein:
      a first cluster group comprises vectors associated with positive value preferences and positive value gaps;
      a second cluster group comprises vectors associated with negative value preferences and positive value gaps; and
      a third cluster group comprises vectors associated with positive value preferences and negative value gaps.

7. The system of claim 1, wherein the operations further comprise:
   identifying a value criteria for the promotion for display; and
   delivering promotion displays corresponding to different value criteria at the same time.

8. The system of claim 1, wherein the value gaps comprise results of a modeling calibration within a consumer decision map.

9. The system of claim 4, wherein:
   the group of members comprises one or more members that did not receive the one or more online surveys; and
   the predictive model estimates a segment membership for the one or more members that did not receive the one or more online surveys.

10. A computer-implemented method comprising:
   implementing a cloud-based service comprising a distributed portion that executes at one or more client devices and a cloud portion executed by the one or more processors, the distributed portion configuring the one or more client devices to prefilter population data by processing the population data to generate packets comprising sets of paired comparisons associated with rankings before uploading the prefiltered population data to a network, the one or more client devices comprising display devices;
   receiving, from the network, the prefiltered population data previously prefiltered by the one or more client devices, the prefiltered population data comprising the packets associated with a plurality of users;
   determining value preferences and value gaps for the plurality of users based on the prefiltered population data and the packets;
   generating a plurality of vectors corresponding to the plurality of users, the plurality of vectors having lengths equivalent to numbers associated with the value preferences and the value gaps;
   clustering the plurality of users based on the plurality of vectors;
   generating a predictive model that generates a group of members, the group of members comprising one or more of the plurality of users; and
   generating, based on the predictive model and the clustered users, a promotion for display on the display devices of the one or more client devices in the group of members.

11. The method of claim 10, wherein clustering the plurality of users comprises applying a value-based clustered segmentation; and the promotion for display comprises content corresponding to advertisement data generated from the value-based clustered segmentation.

12. The method of claim 10, wherein generating the plurality of vectors comprises employing a Bradley-Terry-Luce model to analyze a relative strength of the value preferences and the value gaps;
   the plurality of vectors comprise binary vectors each including a value preference and a value gap; and
   each of the plurality of vectors comprises a predetermined threshold to determine if a value preference and value gap are both positive, both negative, or if one is positive and one is negative.

13. The method of claim 10, further comprising:
   periodically filtering a population to identify the plurality of users; and
   delivering one or more online surveys to the plurality of users according to a predefined schedule.

14. The method of claim 13, wherein delivering the one or more online surveys comprises receiving instructions from a third-party server to deliver the one or more online surveys concurrently.

15. The method of claim 10, wherein clustering the plurality of users comprises:
   determining value signs each of the value preferences and each of the value gaps, the value signs being either positive or negative;
   clustering the plurality of vectors based a relationship between value signs of the value preferences and the value gaps,
   wherein:
      a first cluster group comprises vectors associated with positive value preferences and positive value gaps;
      a second cluster group comprises vectors associated with negative value preferences and positive value gaps; and
      a third cluster group comprises vectors associated with positive value preferences and negative value gaps.

16. The method of claim 10, further comprising:
   identifying a value criteria for the promotion for display; and
   delivering promotion displays corresponding to different value criteria at the same time.

17. The method of claim 13, wherein
   the group of members comprises one or more members that did not receive the one or more online surveys;
   the value preferences comprise answers to questions in the one or more online surveys; and
   the value gaps comprise results of a modeling calibration within a consumer decision map.

18. A non-transitory computer-readable medium storing instructions that, when executed by a processor, cause the processor to perform operations comprising:
   implementing a cloud-based service comprising a distributed portion that executes at one or more client devices and a cloud portion executed by the one or more processors, the distributed portion configuring the one or more client devices to prefilter population data by processing the population data to generate packets comprising sets of paired comparisons associated with rankings before uploading the prefiltered population data to a network, the one or more client devices comprising display devices;
   receiving, from the network, the prefiltered population data previously prefiltered by the one or more client devices, the prefiltered population data comprising a packet of data comprising the packets associated with a plurality of users;

determining value preferences and value gaps for the plurality of users based on the prefiltered population data and the packets;

generating a plurality of vectors corresponding to the plurality of users, the plurality of vectors having lengths equivalent to numbers associated with the value preferences and the value gaps;

clustering the plurality of users based on the plurality of vectors;

generating a predictive model that generates a group of members, the group of members comprising one or more of the plurality of users; and generating, based on the predictive model and the clustered users, a promotion for display on the display devices of the one or more client devices in the group of members.

19. The system of claim 1, wherein:

the packets are packets of survey data comprising survey responses for a modeling calibration; and the paired comparisons are survey paired comparisons comprising data selections between two company products and between two user preferences; and processing the population data to generate the packets comprises analyzing the population data with a latent variable model to determine the ranking.

20. The system of claim 19, wherein the predictive model generates the group of members based on the survey data and the survey paired comparisons.

* * * * *